T. J. LINDSAY.
WHEEL AND AXLE.
APPLICATION FILED NOV. 6, 1913.
1,168,017.
Patented Jan. 11, 1916.
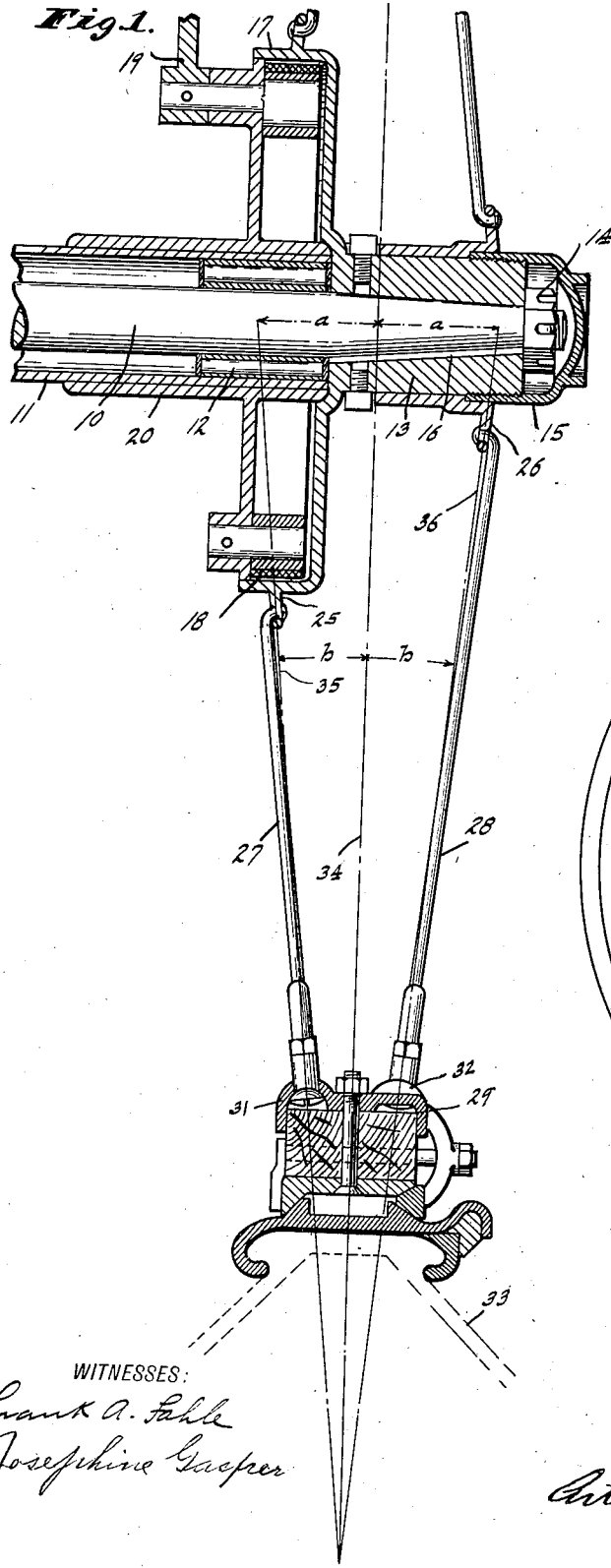
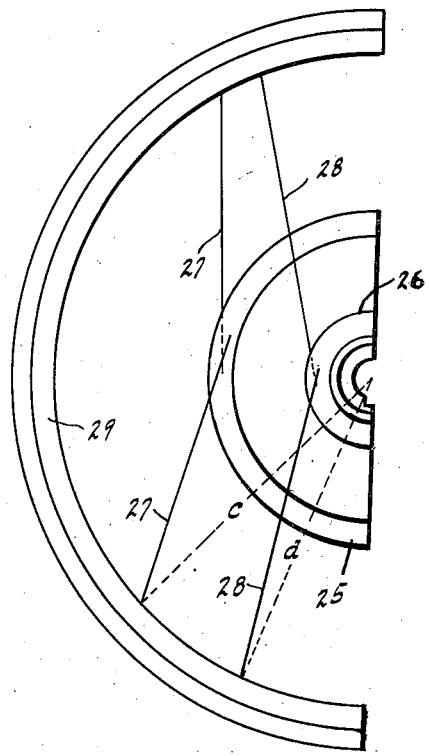
WITNESSES:
Frank A. Fahle
Josephine Gaeper
INVENTOR
Thomas J. Lindsay,
BY Arthur M. Good
ATTORNEY

UNITED STATES PATENT OFFICE.

THOMAS J. LINDSAY, OF INDIANAPOLIS, INDIANA.

WHEEL AND AXLE.

1,168,017.  Specification of Letters Patent.  Patented Jan. 11, 1916.

Application filed November 6, 1913. Serial No. 799,434.

*To all whom it may concern:*

Be it known that I, THOMAS J. LINDSAY, a citizen of the United States, residing at Indianapolis, in the county of Marion and State of Indiana, have invented a new and useful Wheel and Axle, of which the following is a specification.

It is the object of my invention to produce a wheel and axle in which the wheel has wire spokes, is perfectly balanced, most effectively transmits stresses from the brake drum to the wheel tread and does so with the least tendency to twist the parts from their normal positions, carries the stresses between the brake and the brake drum through the axial center of the contact between them, and may be used on standard constructions of automobile rear axles and brakes in place of the common wood-spoke wheels while maintaining the tread of the wheel in the same location with relation to the rear axle.

The accompanying drawing illustrates my invention.

In this drawing, Figure 1 is a partial longitudinal section through a wheel and axle embodying my invention; and Fig. 2 is a partial side elevation showing the spoke arrangement.

The rear axle is here shown as of the semi-floating type, the driving spindle 10 being within a tubular casing member 11 in the end of which are located suitable bearings 12 whereby the outer end of the casing member 11 supports the spindle 10 near the outer end of the latter. The spindle 10, as here shown, projects beyond the end of the tubular casing member 11, and is conveniently tapered to receive the hub 13 of the driving wheel, such hub conveniently being held in place on the tapered end of the spindle 10 by a nut 14, beneath the cap 15, and prevented from rotation on the spindle 10 by a key 16.

The hub 13 is illustrated as being of the two-part type shown in my co-pending application, Ser. No. 788,428, filed Sept. 6, 1913, as such type greatly facilitates construction. A brake drum 17 is fixed on the hub 13, conveniently though not necessarily being integral therewith, said brake drum projecting inward over the outer end of the tubular casing member 11 but being spaced a considerable radial distance therefrom. An expanding brake 18, operable by suitable mechanism through the setting lever 19, is located within and coöperates with the inner surface of the brake drum 17, said brake 18 being carried by a member 20 suitably fixed on the outer end of the tubular casing member 11.

The periphery of the brake drum 17 is provided with an outwardly projecting circumferential flange 25, and the hub 13 is provided with an outwardly projecting circumferential flange 26, this latter flange ordinarily being considerably smaller in diameter than the former flange because of the differences in diameters of the hub and the brake drum. These two flanges are connected by sets of spokes 27 and 28 respectively to the rim 29 of the wheel, the outer ends of these two sets of spokes conveniently being fastened in channels 31 and 32 respectively in the wheel felly or rim, though this latter feature is not necessary. The wheel rim is conveniently of the type shown in my co-pending application, Ser. No. 736,481, filed Dec. 13, 1912, and it is unnecessary for it to be described in detail here. This rim carries the usual pneumatic tire 33, the plane of the tread of which is indicated by the chain line 34. The flanges 25 and 26 are located at such distances on opposite sides of the plane 34 that the cones determined by the circles in which are located the inner and outer ends of the sets of spokes 27 and 28 have their apices at equal distances *a* from such plane and are composed of elements 35 and 36 respectively which make equal angles *b* with such plane 34 and intersect such plane where they interest each other. By the equiangular arrangement of these elements, the balance of the wheel is maintained, and there is as little tendency for the wheel to get "out of true" in one direction as in the other. Furthermore, the flange 25 is so located with respect to the brake drum 17 that the elements 35 of the cone determined by the inner and outer ends of the spokes 27 intersect the coöperating contact faces of the brake drum 17 and the brake 18 at the axial center of such faces when the brake is set. By reason of this the stresses are transmitted directly from the effective center of such contact faces to the rim 29, and the pull on the brake drum is balanced. Furthermore, in order to make most effective the transmission of stresses from the brake drum to the rim, the spokes 27 extend from the flange 25 to the channel 31 substantially tangent to the circle in which are located their points of attachment to the flange 25, as clearly indicated in Fig. 2, so that the angle $c$ between the spokes 27 and the wheel radii intersecting their outer ends is much larger than the angle $d$ between the spokes 28 and the wheel radii intersecting their outer ends, as also indicated in Fig. 2.

I claim as my invention:

1. A wheel comprising a felly, a hub and a brake drum interconnected with each other, said felly and hub being interconnected, and wire spokes extending inwardly from said felly to said brake drum, the cone determined by the circles in which are located the inner and outer ends of said spokes being comprised of elements which intersect the braking surface of the brake drum at substantially the axial center thereof.

2. A wheel comprising a felly, a hub and a brake drum interconnected with each other, said felly and hub being interconnected, and wire spokes extending inwardly from said felly to said brake drum, the cone determined by the circles in which are located the inner and outer ends of said spokes being comprised of elements which intersect the braking surface of the brake drum.

In witness whereof, I have hereunto set my hand at Indianapolis, Indiana, this first day of November, A. D. one thousand nine hundred and thirteen.

THOMAS J. LINDSAY.

Witnesses:
  LOUISE BENNETT,
  G. B. SCHLEY.